United States Patent
Fischer

(10) Patent No.: US 7,721,832 B2
(45) Date of Patent: May 25, 2010

(54) WALKING BEAM SUSPENSION

(75) Inventor: Douglas Robert Fischer, Parkersburg, IA (US)

(73) Assignee: Deere & Company, Moline, IL (US)

( * ) Notice: Subject to any disclaimer, the term of this patent is extended or adjusted under 35 U.S.C. 154(b) by 399 days.

(21) Appl. No.: 11/832,056

(22) Filed: Aug. 1, 2007

(65) Prior Publication Data
US 2009/0033068 A1    Feb. 5, 2009

(51) Int. Cl.
*B60G 9/02* (2006.01)
*B62D 55/104* (2006.01)

(52) U.S. Cl. .................................. 180/9.54; 180/9.5

(58) Field of Classification Search ............... 180/9.5, 180/9.52, 9.54, 9.56, 9.58, 9.6, 9.1, 9.21, 180/9.26; 280/104, 124.1
See application file for complete search history.

(56) References Cited

U.S. PATENT DOCUMENTS

| | | | | |
|---|---|---|---|---|
| 1,474,918 | A | * | 11/1923 | Schneider .................. 180/9.54 |
| 2,863,516 | A | * | 12/1958 | Peterson ...................... 180/9.5 |
| 2,948,347 | A | * | 8/1960 | Risk et al. .................... 180/9.5 |
| 3,010,530 | A | * | 11/1961 | Risk ........................... 180/9.54 |
| 3,653,683 | A | | 4/1972 | Hendrickson |
| 3,964,764 | A | | 6/1976 | Rickardsson |
| 4,061,361 | A | | 12/1977 | Felburn |
| 4,166,511 | A | * | 9/1979 | Stedman ....................... 180/9.5 |
| 4,209,072 | A | | 6/1980 | Orlandea et al. |
| 4,324,304 | A | * | 4/1982 | Hashimoto et al. .......... 180/9.52 |
| 4,519,325 | A | | 5/1985 | Miller |
| 5,228,718 | A | | 7/1993 | Kooistra |
| 5,456,486 | A | * | 10/1995 | Lee ....................... 280/124.107 |
| 6,224,074 | B1 | | 5/2001 | Cadden |
| 6,460,872 | B2 | | 10/2002 | Cadden |
| 6,916,038 | B2 | | 7/2005 | McKenzie et al. |
| 7,017,941 | B2 | | 3/2006 | English |
| 2001/0004149 | A1 | | 6/2001 | Fujiki et al. |
| 2004/0173979 | A1 | | 9/2004 | Ichimura et al. |

FOREIGN PATENT DOCUMENTS

| | | | |
|---|---|---|---|
| DE | 24 61 490 | | 7/1975 |
| DE | 3433312 | | 3/1986 |
| DE | 35 23 111 | | 1/1987 |
| DE | 3834693 | * | 6/1989 |
| DE | 39 01 757 | | 8/1989 |
| DE | 40 32 893 | | 4/1992 |
| EP | 1 108 571 | | 12/2001 |
| FR | 2 883 804 | | 10/2006 |

* cited by examiner

*Primary Examiner*—Anne Marie M Boehler

(57) ABSTRACT

The invention relates to a vehicle suspension system. There is a need for a stable walking beam suspension system where the beam can oscillate and move vertically. Such a suspension system includes a support fixed to the vehicle frame and having first and second ends. A swing arm has a first end pivotally coupled to the first end of the support via a pair of spaced apart pivot pins. Air bags are coupled between the frame and the second end of the swing arm. A walking beam has opposite ends coupled to left and right wheel support assemblies. The walking beam is pivotally coupled to the swing arm. A damping cylinder is coupled between the frame and the second end of the swing arm. Resilient bumper members are engagable with the walking beam and are mounted on an end of the swing arm and fixed to an end of the support.

9 Claims, 4 Drawing Sheets

WALKING BEAM SUSPENSION

FIELD OF THE INVENTION

The present invention relates to a walking beam type vehicle suspension.

BACKGROUND OF THE INVENTION

A currently available tracked agricultural tractor includes a walking beam suspension which supports the front of the chassis on left and right track assemblies. U.S. Pat. No. 4,209,072 shows a wheeled agricultural tractor which includes a walking beam suspension which supports the front of the chassis on left and right wheel assemblies. These walking beams are connected to the chassis by a fixed pivot pin. This permits the track or wheel assemblies to pivot or oscillate with respect to the chassis about a fore-and-aft axis. However, the chassis cannot move solely vertically with respect to the track or wheel assemblies or the axis of the pivot pin. Therefore, the track or wheel assemblies cannot move together vertically and independently of the chassis. This can adversely effect the ride or comfort of the vehicle, and can sometimes prevent a track assembly from maintaining contact with the terrain. To solve this problem, some commercially available vehicles include a front support beam which is mounted to rubber blocks on either side of the frame. However, it is desired to have a walking beam suspension which permits independent oscillating and vertical translating motion of the walking beam.

A walking beam suspension is shown in U.S. Pat. No. 5,228,718 but this suspension is designed for trucks, and includes a pair of longitudinally oriented suspension assemblies and requires linear stabilizers to stabilize the assembly in a direction parallel to the pivot axis of the walking beam. Also, with this design, the air bags compress in approximately a 1-to-1 ratio to vertical movement of the pivot axis of the walking beam.

SUMMARY OF THE INVENTION

Accordingly, an object of this invention is to provide a walking beam suspension which permits independent oscillating and vertical translating motion of the walking beam.

A further object of this invention is to provide such a walking beam suspension which has stability in a direction parallel to the pivot axis of the walking beam.

These and other objects are achieved by the present invention, wherein a suspension system for a vehicle includes a support fixed to a frame of the vehicle and having first and second ends. A swing arm has a first end pivotally coupled to the first end of the support and has a second end. A resilient air bag unit is coupled between the frame and the second end of the swing arm. A walking beam has opposite ends coupled to respective left and right track assemblies. A pivot pin pivotally couples a central portion of the walking beam to a central portion of the swing arm. A damping cylinder is coupled between the frame and the second end of the swing arm. Resilient bumper members are engagable with the walking beam and are mounted on an end of the swing arm and fixed to an end of the support. The swing arm includes a front arm spaced apart from a rear arm, and a portion of the walking beam is received between the front and rear arms. Spaced apart front and rear pivot pins pivotally couple front and rear arms of the swing arm to front and rear pivot members of the support.

DESCRIPTION OF THE PREFERRED EMBODIMENT

Figure 1:
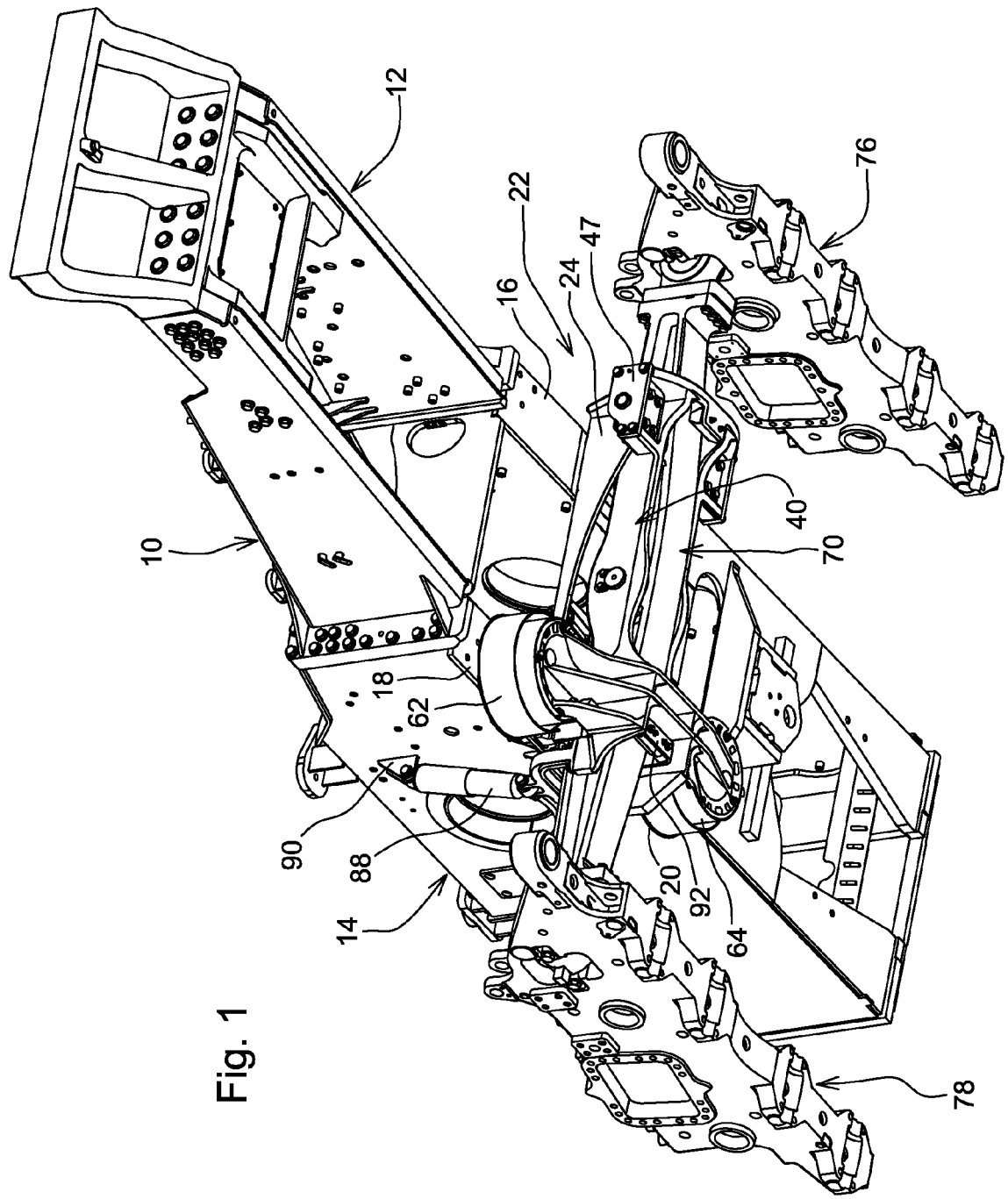
FIG. 1 is a perspective bottom view of suspension system embodying the invention.
Figure 2:
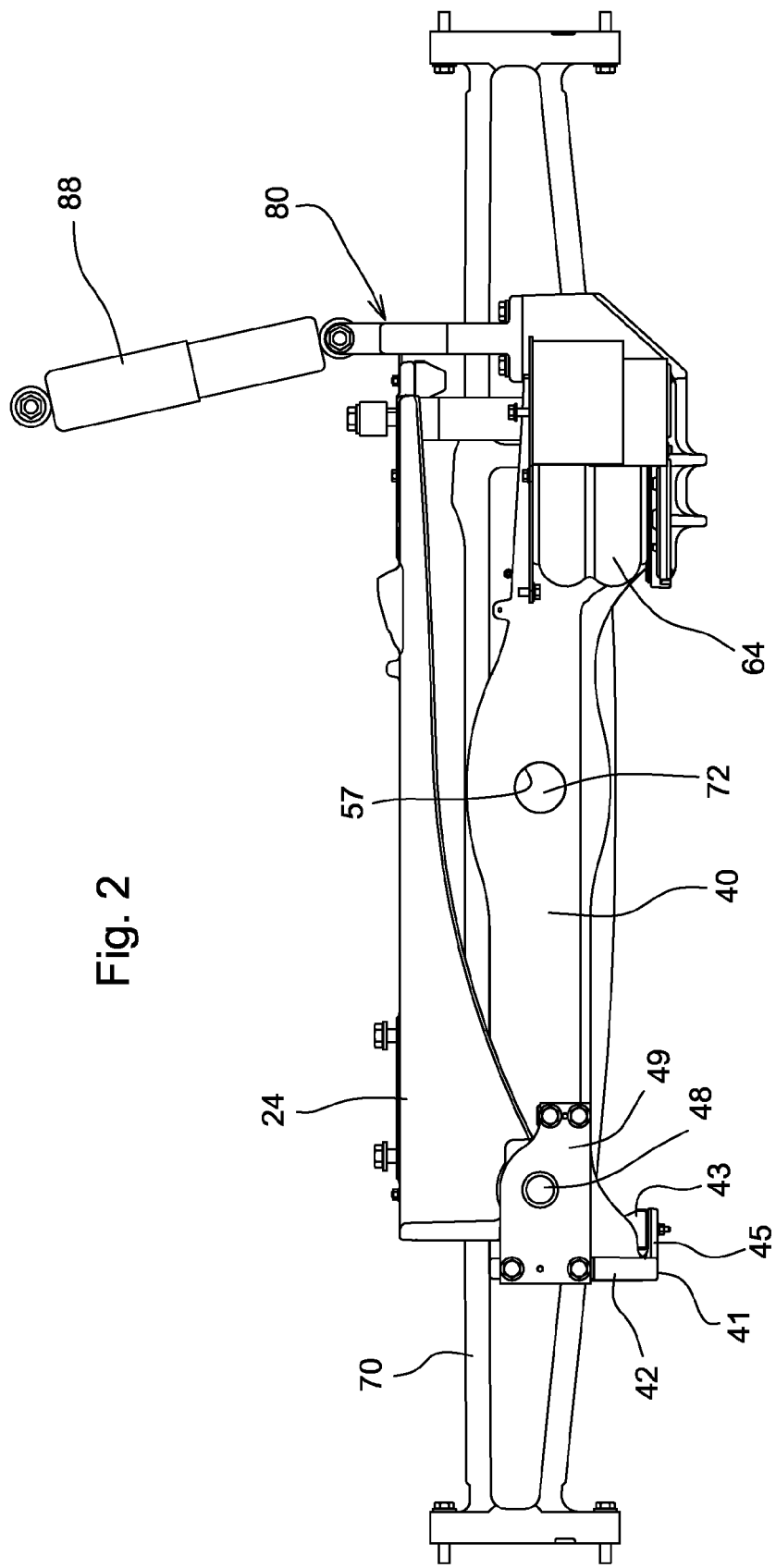
FIG. 2 is a rear side view of the suspension system of FIG. 1.
Figure 3:
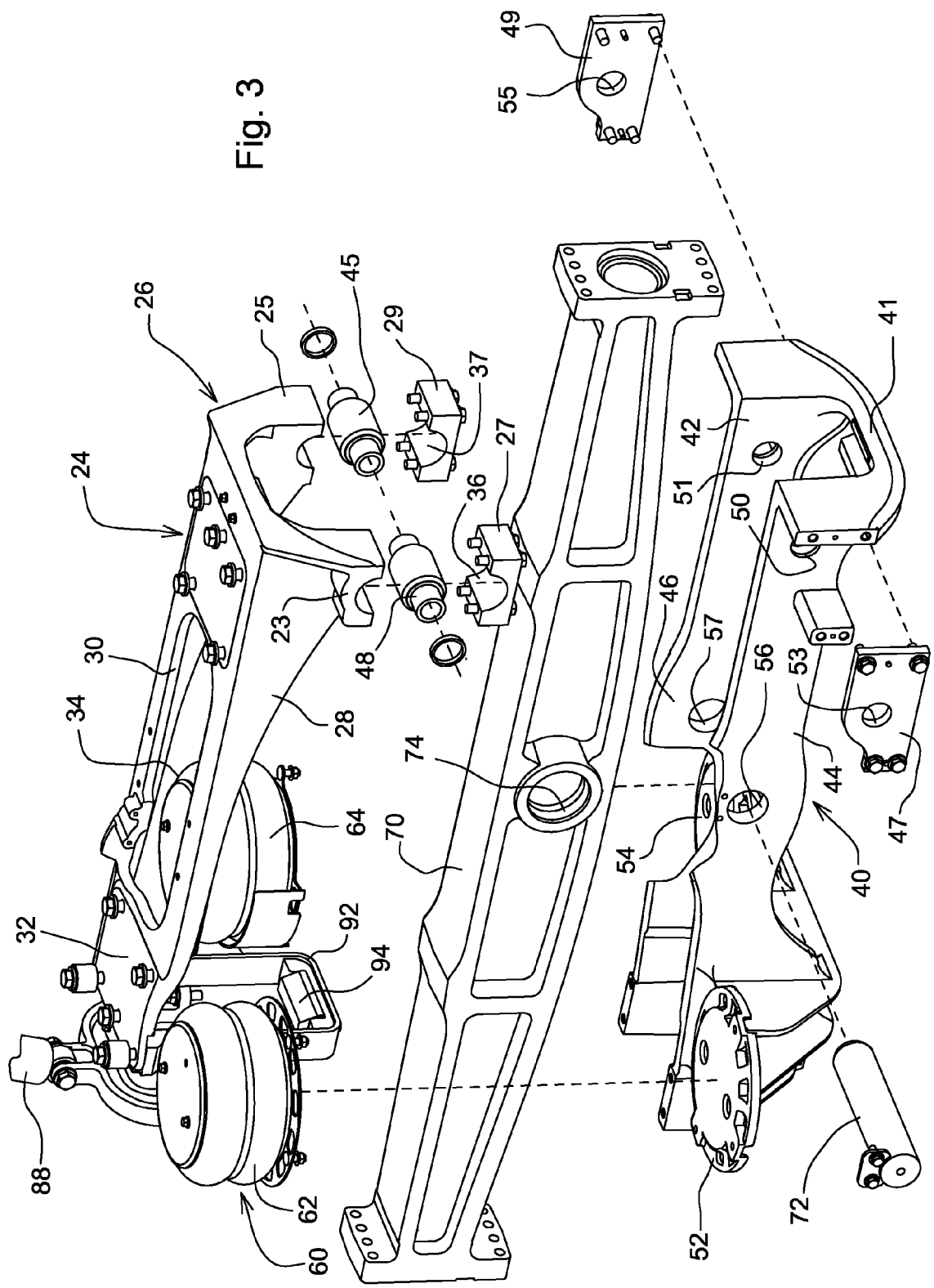
FIG. 3 is an exploded view of the suspension system of FIG. 1.

Referring to FIGS. 1-4, a vehicle chassis 10 includes a left frame part 12 and a right frame part 14. The left frame part 12 includes a horizontally oriented left mounting plate 16. The right frame part 14 includes a horizontally oriented upper front mounting plate 18 and a lower rear mounting plate 20. The chassis 10 is supported by a suspension system 22.

The suspension system 22 includes a transverse support 24 fixed to the chassis mounting plates 16, 18 and 20. Support 24 includes a head 26 at one end, front and rear arms 28 and 30. Head 26 is bolted to the underside of mounting plate 16. A tail plate 32 is fixed to the other end of arms 28 and 30. The head 26 forms a pair of downwardly projecting front and rear pivot arms 23 and 25. Pivot arms 23 and 25 are bolted to a pair of clamp members 27 and 29 to form a front support pivot bore 36 longitudinally spaced apart from a rear support pivot bore 37, both of which are aligned with each other and which extend in the fore-and-aft direction.

The suspension system 22 also includes a transverse swing arm 40 pivotally coupled to the support 24. Swing arm 40 includes a head 42 at one end, and front and rear arms 44 and 46. The left ends of arms 44 and 46 are received between pivot arms 23 and 25 of the support 24. Cover plates 47 and 49 are bolted to flanges which project from the left ends of arms 44 and 46. Front arm 44 includes a first front pivot bore 50 and a second front pivot bore 56. Rear arm 46 includes a first rear pivot bore 51 and a second rear pivot bore 57. Bores 56 and 57 are aligned with each other and are spaced transversely apart from bores 50 and 51. Bores 56 and 57 are spaced apart from each other in the longitudinal or fore-and-aft direction. Bores 50 and 51 are also spaced apart from each other in the longitudinal or fore-and-aft direction. As a result, pivot pin 48 is received between plate 47 and front arm 44, and pivot pin 45 is received between plate 49 and rear arm 46.

Head 42 is pivotally coupled to the head 26 of support 24 by pivot pins 48 and 45 which are received by respective pivot bores 36 and 37, and by bores 50 and 51 in the head end of arms 44 and 46 and by spaced apart bores 53 and 55 in the plates 47 and 49. The fore-and-aft spaced apart pivot pins 48 and 49 provide stability to the swing arm 40 and help prevent movement of the swing arm 40 in the fore-and-aft direction.

An upper front plate 52 is fixed to an end of arm 44. A lower rear plate 54 is fixed to an end of arm 46. Fore-and-aft spaced apart pivot bores 56 and 57 extend fore-and-aft through a central portion of arms 44 and 46. The head 42 includes a lower bridge member 41 which inter-connects the front and rear sides thereof. The upper surface of the bridge member 41 forms a stop or limit surface which is engagable with the walking beam 70 to limits its pivoting in a counter-clockwise direction, viewing FIG. 2. A resilient bumper 43 is mounted on a flange 45 which projects laterally inwardly from bridge member 41 and is engagable with walking beam 70.

Figure 4:
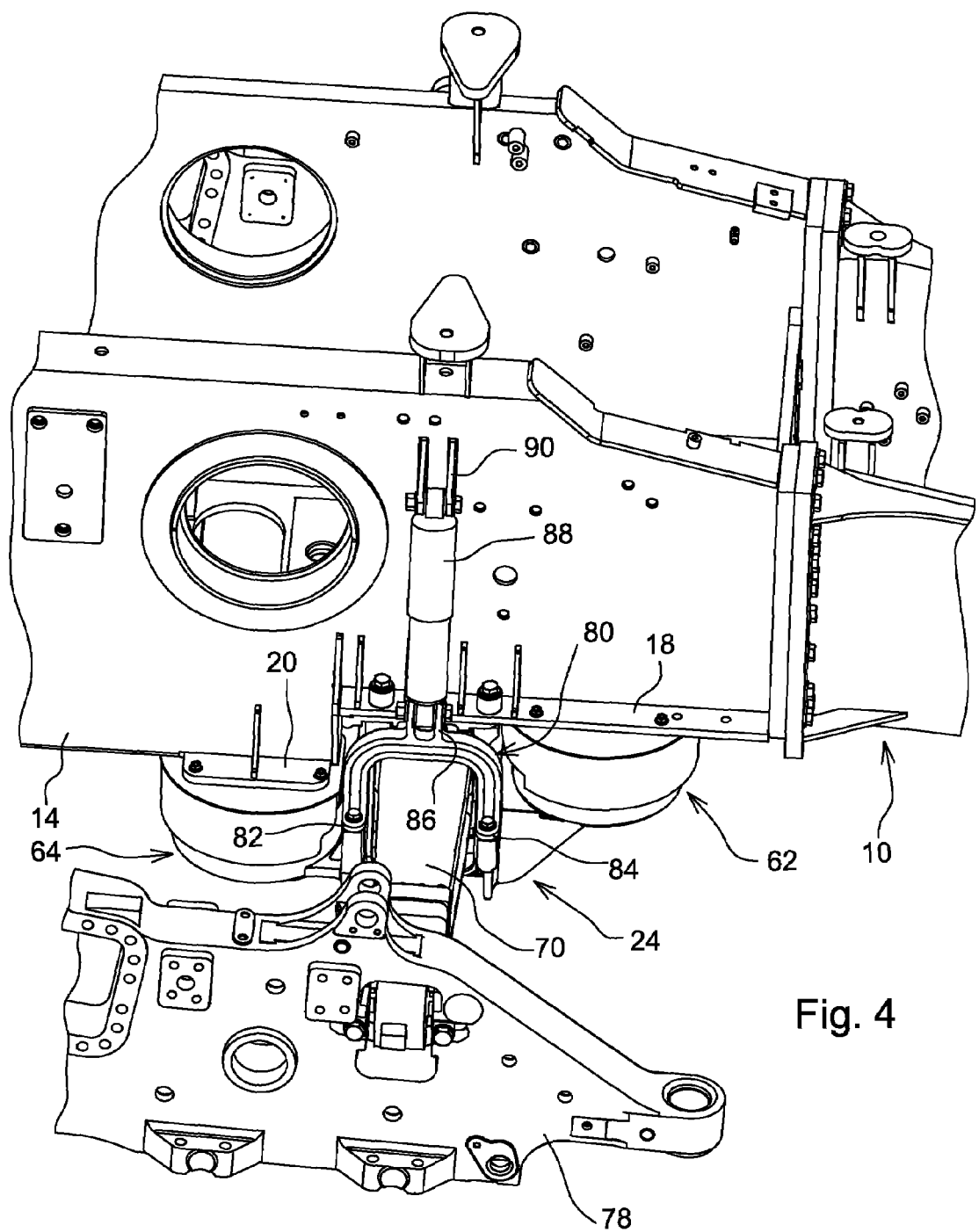
FIG. 4 is a right side elevated perspective view of the suspension system of FIG. 1.

A resilient unit 60 includes a front air bag 62 mounted between mounting plate 18 and plate 52 and a rear air bag 64 mounted between mounting plate 20 and plate and 54. As best seen in FIG. 4, the air bags 62 and 64 are protected by cylindrical protective covers. Because pivot bores 56 are approximately midway between pivot pins 48, 45 and the air bags 62 and 64, the air bags 62 and 64 will compress a distance approximately one-half of the amount of vertical movement of the axis of pivot pin 72.

A walking beam 70 is received between arms 44 and 46 of swing arm 40 and is pivotally coupled to swing arm 40 by a pivot pin 72 which is received by pivot bores 56 and 57 and by pivot bore 74 in the central portion of beam 70. The left end of beam 70 is attached to a left track assembly 76, and the right end of beam 70 is attached to a right track assembly 78.

A yoke 80 has a forked lower ends 82 and 84 which are attached to the right ends of arms 44 and 46, and a central upper post 86 which is coupled to the lower end of a damping cylinder 88. The upper end of damping cylinder 88 is coupled to a bracket 90 which is fixed to a projects from an upper portion of right frame part 14.

A U-shaped limit member 92 hangs down from a lower edge of right frame part 14 and is received by the right end portions of arms 44 and 46. Limit member 92 receives the walking beam 70 and supports a resilient bumper 94 which engages a lower surface of beam 70 and which limits pivoting of beam 70.

As a result, the walking beam 70 can pivot about the axis of pivot pin 72, and pivot pin 72, together with the entire walking beam 70, can move upwards and downwards and swing about the axis of pivot pin 48.

With this suspension system, the front of the vehicle chassis effectively rides on a cushion of air which greatly reduces the vibration and shock levels that are transmitted from the undercarriage to the vehicle chassis and operator. The oscillation joint between the walking beam and the swingarm allows the left and right tracked undercarriages to freely walk over uneven ground independent of vehicle suspension loading.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A suspension system for supporting left and right longitudinally extending frame members of a tracked vehicle with respect to left and right track assemblies, comprising:
    a transverse support fixed to and extending between the left and right frame members, the support having a first end and a second end, the first end having a front pivot member and a rear pivot member, the front pivot member being spaced longitudinally apart from the rear pivot member, a front support pivot bore extending through the front pivot member, and a rear support pivot bore extending through the rear pivot member;
    a transverse swing arm having a first end pivotally coupled to the first end of the support and a second end, the swing arm having a front arm and a rear arm, the front arm being spaced longitudinally apart from the rear arm, a first front bore extending through a first end of the front arm, and a first rear bore extending through a first end of the rear arm, a second front bore extending through the front arm and spaced apart from the first front bore, and a second rear bore extending through the rear arm and spaced apart from the first rear bore;
    a front pivot pin received by the front support pivot bore and the first front bore;
    a rear pivot pin received by the rear support pivot bore and the first rear bore;
    a resilient unit coupled between the frame and the second end of the swing arm;
    a transverse walking beam having opposite ends coupled to the respective left and right track assemblies, and having a beam bore extending through the walking beam in a fore-and-aft direction; and
    a beam pivot pin pivotally coupling a central portion of the walking beam to a portion of the swing arm, the beam pivot pin being received by the beam bore, by the second front bore and by the second rear bore.

2. The suspension system of claim 1, further comprising:
a damping device coupled between the frame and the swing arm.

3. The suspension system of claim 1, further comprising:
a resilient bumper member mounted on an end of the swing arm and engagable with the walking beam.

4. The suspension system of claim 1, further comprising:
a resilient bumper member fixed to an end of the support and engagable with the walking beam.

5. The suspension system of claim 1, further comprising:
a first resilient bumper member mounted on an end of the swing arm and engagable with the walking beam, and a second resilient bumper member fixed to an end of the support and engagable with the walking beam.

6. The suspension system of claim 1, wherein:
the resilient unit comprises an air bag.

7. The suspension system of claim 1, wherein:
a portion of the walking beam is received between the front and rear arms of the swing arm.

8. The suspension system of claim 2, wherein:
the damping device is coupled between the frame and the second end of the swing arm.

9. The suspension system of claim 1, wherein:
the beam pivot pin pivotally couples the walking beam to a central portion of the swing arm.

* * * * *